(12) United States Patent
Hunt et al.

(10) Patent No.: US 9,374,376 B2
(45) Date of Patent: Jun. 21, 2016

(54) ANTI-HACKING SYSTEM FOR QUANTUM COMMUNICATION

(71) Applicant: The Boeing Company, Chicago, IL (US)

(72) Inventors: Jeffrey H. Hunt, Thousand Oaks, CA (US); Wayne Richard Howe, Irvine, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/336,114

(22) Filed: Jul. 21, 2014

(65) Prior Publication Data

US 2016/0105439 A1    Apr. 14, 2016

Related U.S. Application Data

(63) Continuation-in-part of application No. 13/778,944, filed on Feb. 27, 2013.

(51) Int. Cl.
| | |
|---|---|
| *H04L 9/08* | (2006.01) |
| *H04L 29/06* | (2006.01) |
| *G06N 99/00* | (2010.01) |
| *H04B 10/70* | (2013.01) |

(52) U.S. Cl.
CPC .............. *H04L 63/10* (2013.01); *G06N 99/002* (2013.01); *H04B 10/70* (2013.01); *H04L 9/0852* (2013.01); *H04L 9/0855* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,881,473 B2 | 2/2011 | Wang et al. | |
| 8,200,093 B2 * | 6/2012 | Hunt | H04B 10/1125 398/115 |
| 8,762,728 B2 * | 6/2014 | Wiseman | H04L 9/0838 380/256 |
| 2004/0184603 A1 * | 9/2004 | Pearson | H04L 9/0855 380/28 |
| 2004/0206888 A1 * | 10/2004 | Klotzer | B82Y 10/00 250/216 |
| 2005/0138359 A1 * | 6/2005 | Simon | H04L 63/0823 713/156 |
| 2005/0249352 A1 * | 11/2005 | Choi | H04L 9/0852 380/286 |
| 2009/0097862 A1 * | 4/2009 | Munro | B82Y 10/00 398/175 |
| 2009/0114925 A1 * | 5/2009 | Ajiki | B82Y 10/00 257/79 |
| 2009/0317089 A1 * | 12/2009 | Peters | H04L 9/0855 398/173 |
| 2010/0046754 A1 * | 2/2010 | Gilfedder | H04B 10/70 380/255 |
| 2010/0252745 A1 * | 10/2010 | Hunt | G01S 7/4861 250/372 |

(Continued)

OTHER PUBLICATIONS

Final Office action, dated May 19, 2015, regarding U.S. Appl. No. 13/778,944, 20 pages.

(Continued)

*Primary Examiner* — Michael R Vaughan
*Assistant Examiner* — Richard McCoy
(74) *Attorney, Agent, or Firm* — Yee & Associates, P.C.

(57) ABSTRACT

A method and apparatus for reducing unauthorized access of an information stream. The information stream is received at a node along a path to a destination node. The information stream comprises information bits and quantum bits that are interspersed with each other. A portion of the quantum bits are examined at the node along the path. An occurrence of unauthorized access to the information stream is indicated when an original entangled state of the portion of the quantum bits is absent.

20 Claims, 9 Drawing Sheets

(56) References Cited

U.S. PATENT DOCUMENTS

| | | | | |
|---|---|---|---|---|
| 2011/0090841 A1* | 4/2011 | Shyy | H04W 88/04 370/319 |
| 2012/0050834 A1* | 3/2012 | Harrison | B82Y 10/00 359/107 |
| 2012/0093521 A1* | 4/2012 | Harrison | B82Y 10/00 398/173 |
| 2012/0148237 A1* | 6/2012 | Harrison | B82Y 10/00 398/37 |
| 2012/0195597 A1* | 8/2012 | Malaney | H04L 9/0852 398/115 |
| 2013/0251145 A1* | 9/2013 | Lowans | H04L 9/0838 380/44 |

OTHER PUBLICATIONS

Office action, dated Jan. 28, 2015, regarding U.S. Appl. No. 13/778,944, 17 pages.

Bashar et al., "A Review and Prospects of Quantum Teleportation," Masaum Journal of Basic and Applied Sciences, vol. 1, No. 2, Sep. 2009, pp. 296-301.

Hughes et al., "Practical Free-Space Quantum Key Distribution Over 10 Km in Daylight and at Night," New Journal of Physics 4, Jul. 2002, pp. 43.1-43.14.

Buttler et al., "Daylight Quantum Key Distribution Over 1.6 Km," Feb. 1, 2008, 4 pages, accessed Feb. 1, 2013. http://arxiv.org/abs/quant-ph/0001088.

Braunstein et al., "Teleportation of Continuous Quantum Variables," Physical Review Letters, vol. 80, No. 4, Jan. 26, 1998, pp. 869-872.

Hunt et al., "Quantum Communication Using Quantum Teleportation," U.S. Appl. No. 13/778,944, filed Feb. 27, 2013, 31 pages.

Notice of Allowance, dated Oct. 7, 2015, regarding U.S. Appl. No. 13/778,944, 12 pages.

* cited by examiner

ANTI-HACKING SYSTEM FOR QUANTUM COMMUNICATION

CROSS-REFERENCE TO RELATED APPLICATION

This application is a continuation-in-part of U.S. patent application Ser. No. 13/778,944, filed Feb. 27, 2013, entitled "Quantum Communication Using Quantum Teleportation," which is incorporated herein by reference.

BACKGROUND INFORMATION

1. Field

The present disclosure relates generally to quantum communication and, in particular, to quantum communication within a communications network. Still more particularly, the present disclosure relates to an apparatus and method for reducing unauthorized access to an information stream sent across nodes in a communications network.

2. Background

Quantum communication involves encoding information in quantum bits. As used herein, a "quantum bit," which may be also referred to a qubit, is a two-state quantum mechanical system. The quantum mechanical system may be realized using, for example, without limitation, the polarization of a single photon. The qubit may have two polarization states, vertical polarization and horizontal polarization. Quantum mechanics allows a qubit to be in one state, the other state, or a superposition of both states at any given point in time.

Quantum cryptography is the use of quantum mechanical effects to perform cryptographic tasks, such as, for example, encrypting and decrypting data. Quantum key distribution is a widely used quantum cryptographic technique that allows secure point-to-point communication. Point-to-point communication may be communication between a sender and a receiver over a direction communications channel between the sender and the receiver.

With quantum key distribution, the sender and the receiver may produce a shared random encryption key that is known only to them. The random encryption key may be a set of data bits that have been encoded using qubits. The sender encrypts the data using the random encryption key and sends this quantum encrypted data to the receiver. The receiver decrypts the quantum encrypted data using the random encryption key. This type of quantum encryption may ensure secure communications over standard communications channels, such as, for example, unsecure public communications channels.

However, this type of quantum cryptographic technique may require a direct connection between the sender and the receiver for the generation and sharing of the random encryption key. Consequently, using quantum key distribution to send encrypted data over a large communications network comprised of multiple nodes may be more difficult than desired and, in some cases, may not be feasible.

Some currently available methods for transporting an encryption key from a sender to a receiver across multiple nodes within a communications network may require that each of the nodes have quantum key distribution capabilities. In some cases, routing algorithms, graph theory algorithms, and metrics that have been disseminated to all nodes within the communications network may be used to transport encryption keys across these nodes.

However, these types of methods may be more time-consuming than desired and/or may require more processing power, hardware resources, and/or software resources than desired. Further, ensuring that every node within a communications network has quantum key distribution capabilities may be more expensive than desired. Therefore, it would be desirable to have a method and apparatus that takes into account at least some of the issues discussed above, as well as other possible issues.

SUMMARY

In one illustrative embodiment, a method for reducing unauthorized access of an information stream is presented. The information stream is received at a node along a path to a destination node. The information stream comprises information bits and quantum bits that are interspersed with each other. A portion of the quantum bits are examined at the node along the path. An occurrence of unauthorized access to the information stream is indicated when an original entangled state of the portion of the quantum bits is absent.

In another illustrative embodiment, an apparatus comprises an origination node. The origination node generates an information stream comprising information bits and quantum bits that are interspersed with each other and sends the information stream to a destination node along a path. The quantum bits have an original entangled state.

In yet another illustrative embodiment, a communication system comprises an origination node, a destination node, and a set of nodes. The origination node generates an information stream comprising information bits and quantum bits that are interspersed with each other and sends the information stream to a receiving node along a path. The destination node receives the information stream. The set of nodes form the path from the origination node to the destination node. A node in the set of nodes receives the information stream through the node along a path to the destination node. The information stream comprises the information bits and the quantum bits that are interspersed with each other; examines a portion of the quantum bits; and indicates an occurrence of unauthorized access to the information stream when an original entangled state of the portion of the quantum bits is absent.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method for allowing a first communicator to send quantum encrypted data to a second communicator across one or more nodes in a communications network. In particular, the illustrative embodiments recognize and take into account that it may be desirable to have a method for sending quantum encrypted data across a node in a communications network without requiring that node to have quantum key distribution capabilities.

Thus, the illustrative embodiments provide an apparatus and method for sending quantum encrypted data across a node. In one illustrative example, the node receives an input signal comprised of incoming photons carrying encrypted data. Quantum states of the incoming photons are transferred to outgoing photons using quantum teleportation such that the encrypted data is transferred, or copied, to the outgoing photons. An output signal comprised of the outgoing photons carrying the encrypted data may then be sent out from the node to a next node.

In this manner, the node may be capable of handling the encrypted data without needing to decrypt the encrypted data or have knowledge of the encryption key used to encrypt the data. More specifically, the node may use quantum teleportation to route the encrypted data received at the node to the next node without altering the encrypted data.

Figure 1:
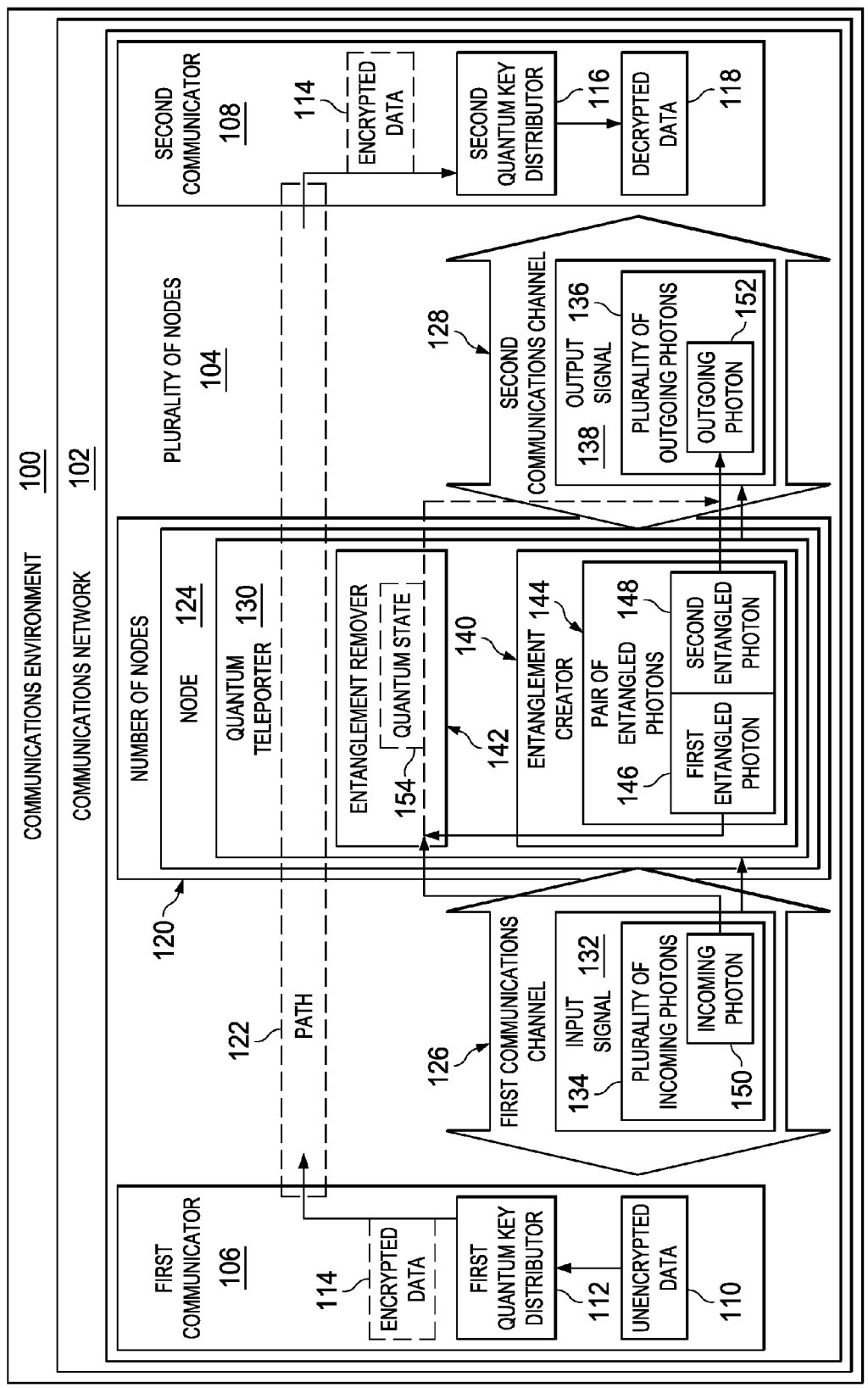
FIG. 1 is an illustration of a communications environment in the form of a block diagram in accordance with an illustrative embodiment.

Referring now to the figures and, in particular, with reference to FIG. 1, an illustration of a communications environment is depicted in the form of a block diagram in accordance with an illustrative embodiment. Communications environment 100 includes communications network 102. Communications network 102 may be comprised of plurality of nodes 104.

As used herein, a "node" in plurality of nodes 104 may be implemented in a number of different ways. For example, without limitation, a node may comprise at least one of a communications device, a switching device, a network switch, a router, a processor unit, a computer, an integrated circuit, a modem, a hub, a server, a workstation, a digital handset, or some other type of communications device.

As used herein, the phrase "at least one of," when used with a list of items, means different combinations of one or more of the listed items may be used and only one of the items in the list may be needed. For example, "at least one of item A, item B, and item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination. The item may be a particular object, thing, or a category. In other words, "at least one of" means any number of and any combination of items may be used from the list, but not all of the items in the list may be required.

First communicator 106 and second communicator 108 may be examples of nodes in plurality of nodes 104. First communicator 106 is configured to send secure data to second communicator 108. For example, first communicator 106 may encrypt unencrypted data 110 using first quantum key distributor 112 to form encrypted data 114. Second communicator 108 may receive encrypted data 114 and then decrypt encrypted data 114 using second quantum key distributor 116 to form decrypted data 118. Decrypted data 118 may contain unencrypted data 110. In this manner, second quantum key distributor 116 may decrypt encrypted data 114 to retrieve unencrypted data 110.

In this illustrative example, first quantum key distributor 112 and second quantum key distributor 116 may be implemented using standard quantum key distribution protocols. First quantum key distributor 112 and second quantum key distributor 116 may communicate over a quantum channel (not shown in this view) to share a quantum encryption key that may be used to encrypt and decrypt data. In this manner, encrypted data 114 may be quantum encrypted data.

The quantum encryption key may be comprised of one or more qubits. In some cases, the quantum encryption key may be a continuous stream of qubits. Further, depending on the implementation, the quantum encryption key may or may not be random.

In one illustrative example, first quantum key distributor 112 may include an encryptor configured to receive a random number from a random number generator. The random number generator may be implemented within or outside of first quantum key distributor 112. The encryptor may use the random number to encrypt unencrypted data 110 and form encrypted data 114.

As depicted, encrypted data 114 may be sent from first communicator 106 to second communicator 108 across number of nodes 120 along path 122. As used herein, a "number of," when used in reference to items, may mean one or more items. In this manner, number of nodes 120 may be one or more nodes.

In this illustrative example, path 122 may comprise the sequence of nodes in communications network 102 through which encrypted data 114 is transmitted. Path 122 may include first communicator 106, second communicator 108, and number of nodes 120. Number of nodes 120 may use quantum teleportation to send encrypted data 114 received at number of nodes 120 from first communicator 106 to second communicator 108. By using quantum teleportation, encrypted data 114 may remain encrypted as encrypted data 114 passes through number of nodes 120.

Node 124 is an example of one of number of nodes 120. Node 124 may be configured to receive encrypted data 114 over first communications channel 126 and send out encrypted data 114 over second communications channel 128. As used herein, a "communications channel," such as first communications channel 126 and second communications channel 128, may be selected from a group that includes a wired communications channel, a wireless communications channel, an optical communications channel, a fiberoptic channel, a waveguide, or some other type of communications channel or link.

Node 124 uses quantum teleporter 130 to receive and send out encrypted data 114. In particular, quantum teleporter 130 may receive input signal 132 over first communications channel 126 from a previous node with respect to path 122. This previous node may be first communicator 106 or one of number of nodes 120. Input signal 132 may be comprised of plurality of incoming photons 134 arriving at quantum teleporter 130 over time.

Quantum teleporter 130 uses plurality of incoming photons 134 to form plurality of outgoing photons 136. Quantum teleporter 130 sends out plurality of outgoing photons 136 in the form of output signal 138 over second communications channel 128 to a next node with respect to path 122.

As depicted, quantum teleporter 130 includes entanglement creator 140 and entanglement remover 142. Entanglement creator 140 is configured to create pair of entangled photons 144 for each one of plurality of incoming photons 134 received. Pair of entangled photons 144 includes first entangled photon 146 and second entangled photon 148. First entangled photon 146 and second entangled photon 148 may be considered entangled when the quantum state of each of these photons may need to be described with reference to the other photon, even though the two photons may be physically separated.

First entangled photon 146 is sent to meet with one of plurality of incoming photons 134. For example, first entangled photon 146 may be sent to meet with incoming photon 150 in entanglement remover 142. Second entangled photon 148 may be sent in a different direction as outgoing photon 152. Incoming photon 150 may carry encrypted information.

Entanglement remover 142 receives both incoming photon 150 and first entangled photon 146. In response to receiving both incoming photon 150 and first entangled photon 146, entanglement remover 142 removes, or destroys, the entanglement between first entangled photon 146 and second entangled photon 148.

When the entanglement between first entangled photon 146 and second entangled photon 148 is removed, outgoing photon 152 is formed. Simultaneously, quantum state 154 of incoming photon 150 is transferred to, or copied to, outgoing photon 152. The transferring of quantum state 154 of incoming photon 150 to outgoing photon 152 results in the encrypted information that is carried by incoming photon 150 being teleported to outgoing photon 152. Outgoing photon 152 carrying the encrypted information may then be sent out, or output, from quantum teleporter 130.

As a result of this quantum teleportation, outgoing photon 152 output from quantum teleporter 130 may be relatively indistinguishable from incoming photon 150 received at quantum teleporter 130. In this manner, encrypted data 114 carried by plurality of incoming photons 134 may be teleported to plurality of outgoing photons 136 without ever being decrypted, modified, or processed in some other manner.

Each node in plurality of nodes 104 may have a quantum teleporter similar to quantum teleporter 130. In this manner, quantum teleportation may be used to send quantum encrypted data across one or more of plurality of nodes 104 in communications network 102.

The illustration of communications network 102 within communications environment 100 in FIG. 1 is not meant to imply physical or architectural limitations to the manner in which an illustrative embodiment may be implemented. Other components in addition to or in place of the ones illustrated may be used. Some components may be optional. Additionally, the blocks are presented to illustrate some functional components. One or more of these blocks may be combined, divided, or combined and divided into different blocks when implemented in other illustrative embodiments.

For example, although first quantum key distributor 112 is depicted as being part of first communicator 106, first quantum key distributor 112 may be considered separate from first communicator 106, but in communication with first communicator 106 in other examples. Similarly, although second quantum key distributor 116 is depicted as being part of second communicator 108, second quantum key distributor 116 may be considered separate from second communicator 108, but in communication with second communicator 108 in other examples.

Further, although the illustrative embodiments have been described using photons, some other type of quantum mechanical system may be used. For example, without limitation, input signal 132 may be comprised of a plurality of incoming electrons and output signal 138 may be comprised of a plurality of outgoing electrons. In other words, quantum communications and quantum cryptography between plurality of nodes 104 may be implemented using electrons instead of photons, or some other type of quantum mechanical system that may be used to form qubits.

Figure 2:
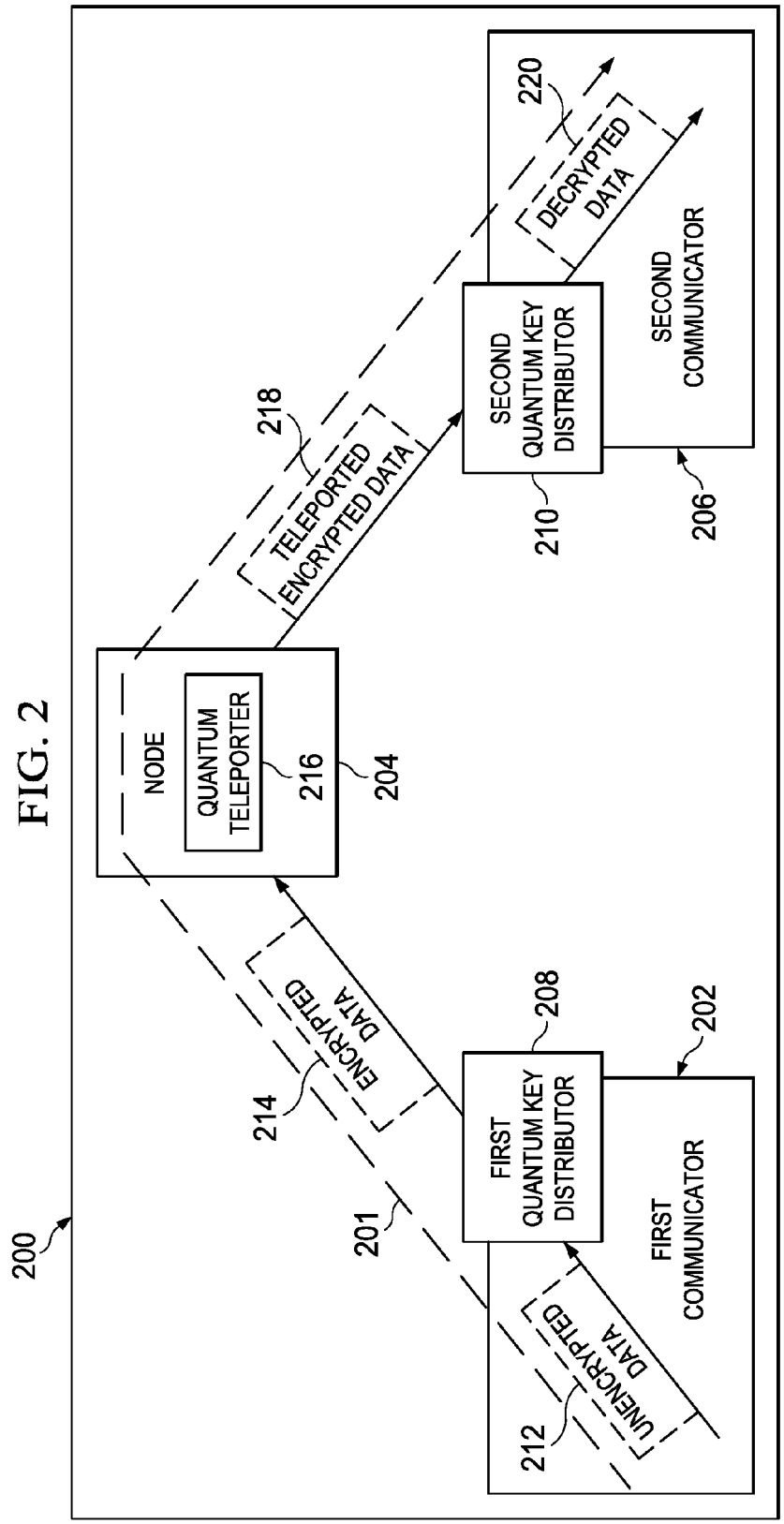
FIG. 2 is an illustration of a path within a communications network in accordance with an illustrative embodiment.

With reference now to FIG. 2, an illustration of a path within a communications network is depicted in accordance with an illustrative embodiment. Communications network 200 is an example of one implementation for communications network 102 in FIG. 1. Path 201 through communications network 200 includes first communicator 202, node 204, and second communicator 206. First communicator 202, node 204, and second communicator 206 are examples of implementations for first communicator 106, node 124, and second communicator 108, respectively, in FIG. 1.

As depicted, first communicator 202 is configured to encrypt unencrypted data 212 using first quantum key distributor 208 to form encrypted data 214. First communicator 202 sends encrypted data 214 to node 204. Node 204 uses quantum teleporter 216 to teleport the encrypted data and output teleported encrypted data 218. Second communicator 206 uses second quantum key distributor 210 to decrypt teleported encrypted data 218 and form decrypted data 220.

Figure 3:
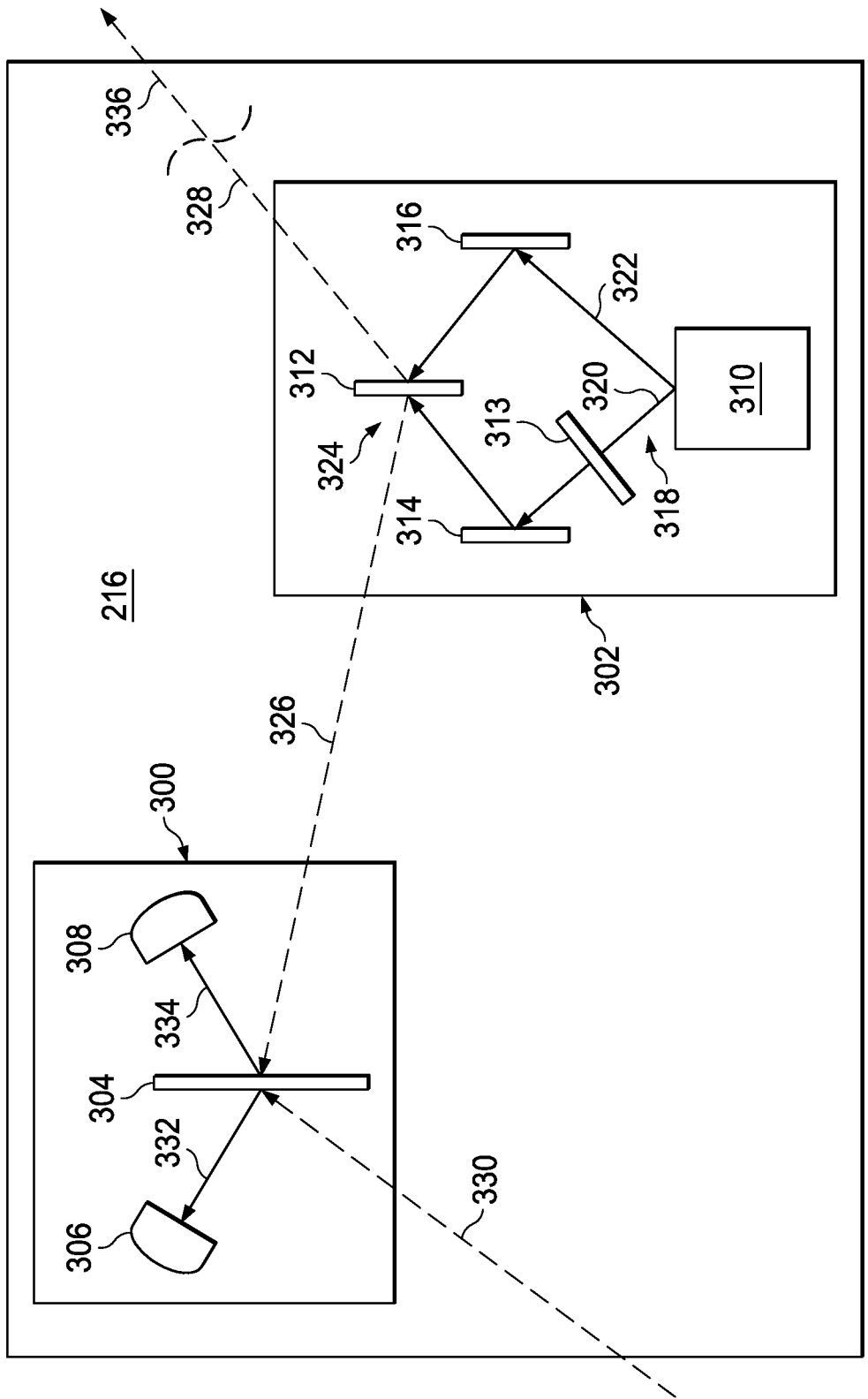
FIG. 3 is an illustration of a quantum teleporter in accordance with an illustrative embodiment.

With reference now to FIG. 3, an illustration of quantum teleporter 216 from FIG. 2 is depicted in accordance with an illustrative embodiment. In this illustrative example, quantum teleporter 216 includes entanglement remover 300 and entanglement creator 302. Entanglement remover 300 includes beam splitter 304, detector 306, and detector 308. Entanglement creator 302 includes coupled photon creator 310, beam splitter 312, wave plate 313, mirror 314, and mirror 316.

As depicted, coupled photon creator 310 is configured to create pair of coupled photons 318. Pair of coupled photons 318 includes first photon 320 and second photon 322. In one illustrative example, coupled photon creator 310 may include a laser, an intensity control device, a polarization control device, a frequency control device, and a nonlinear optical element. The nonlinear optical element may be used to convert a single laser photon emitted from the laser into pair of coupled photons 318.

Beam splitter 312 in entanglement creator 302 may be used to entangle first photon 320 and second photon 322. Prior to becoming entangled with second photon 322, first photon 320 may be sent through wave plate 313. Wave plate 313 is used to change the polarization of first photon 320. In one illustrative example, wave plate 313 takes the form of a half-wave plate that is configured to rotate the polarization direction of first photon 320.

First photon 320 may be sent through wave plate 313 towards mirror 314. Mirror 314 directs first photon 320 towards beam splitter 312. Similarly, second photon 322 is sent towards mirror 316. Mirror 316 directs second photon 322 towards beam splitter 312. In other words, mirror 314 and mirror 316 are used to steer first photon 320 and second photon 322, respectively, towards beam splitter 312. Of course, in other illustrative examples, a plurality of optical elements may be used to steer first photon 320 and second photon 322 towards beam splitter 312.

Beam splitter 312 causes entanglement between first photon 320 and second photon 322 such that pair of entangled photons 324 is formed. Pair of entangled photons 324 includes first entangled photon 326 and second entangled photon 328. In some illustrative examples, first entangled photon 326 may be referred to as a transporter photon.

First entangled photon 326 is sent to meet with incoming photon 330 at entanglement remover 300. Both incoming photon 330 and first entangled photon 326 are received at beam splitter 304 within entanglement remover 300. Incoming photon 330 and first entangled photon 326 are interfered at beam splitter 304. Beam splitter 304 may be implemented using, for example, a 50/50 beam splitter.

Detector 306 and detector 308 may be used to measure first output 332 and second output 334, respectively, of beam splitter 304. Detector 306 and detector 308 may each be implemented using, for example, without limitation, control optics, a polarization measurement device, and a light-to-electronic signal converter. The light-to-electronic signal converter may take the form of, for example, without limitation, a photodiode, an avalanche photodiode, a photomultiplier, or some other type of element.

In response to incoming photon 330 and first entangled photon 326 meeting at beam splitter 304 and the measurement of at least one of first output 332 or second output 334 by detector 306 and detector 308, respectively, the entanglement between first entangled photon 326 and second entangled photon 328 is removed to form outgoing photon 336. Simultaneously, the quantum state of incoming photon 330 is transferred to outgoing photon 336.

In this manner, outgoing photon 336 may have the same quantum state as incoming photon 330 such that outgoing photon 336 is relatively indistinguishable from incoming photon 330. The transferring of the quantum state of incoming photon 330 to outgoing photon 336 results in the teleportation of the encrypted information carried by incoming photon 330 to outgoing photon 336. Quantum teleporter 216 outputs outgoing photon 336.

The illustrations of communications network 200 in FIG. 2 and quantum teleporter 216 in FIG. 3 are not meant to imply physical or architectural limitations to the manner in which an illustrative embodiment may be implemented. Other components in addition to or in place of the ones illustrated may be used. Some components may be optional.

The different components shown in FIG. 3 may be illustrative examples of how components shown in block form in FIG. 1 can be implemented as physical structures. Additionally, some of the components in FIG. 3 may be combined with components in FIG. 1, used with components in FIG. 1, or a combination of the two.

The illustrative embodiments also recognize and take into account that unauthorized access to information in an information stream is undesirable. The illustrative embodiments recognize and take into account, for example, that even though first communicator 106 may send encrypted data 114 to second communicator 108, a third party may attempt to access encrypted data 114 in FIG. 1. For example, a third party may attempt to read encrypted data 114, change encrypted data 114, or otherwise access encrypted data 114. These types of actions may occur with attempts to hack into the connections between first communicator 106 and second communicator 108.

Further, the illustrative embodiments recognize and take into account that encrypting and decrypting data may be performed to prevent unauthorized access to the information. The illustrative embodiments recognize and take into account that encrypting and decrypting data may require more processing power speed than is desired or is available. The amount of processing in encrypting data may require larger and larger processing resources to obtain a generally fast encryption system. Thus, the illustrative embodiments also provide a method and apparatus for reducing unauthorized access to the information stream.

Figure 4:
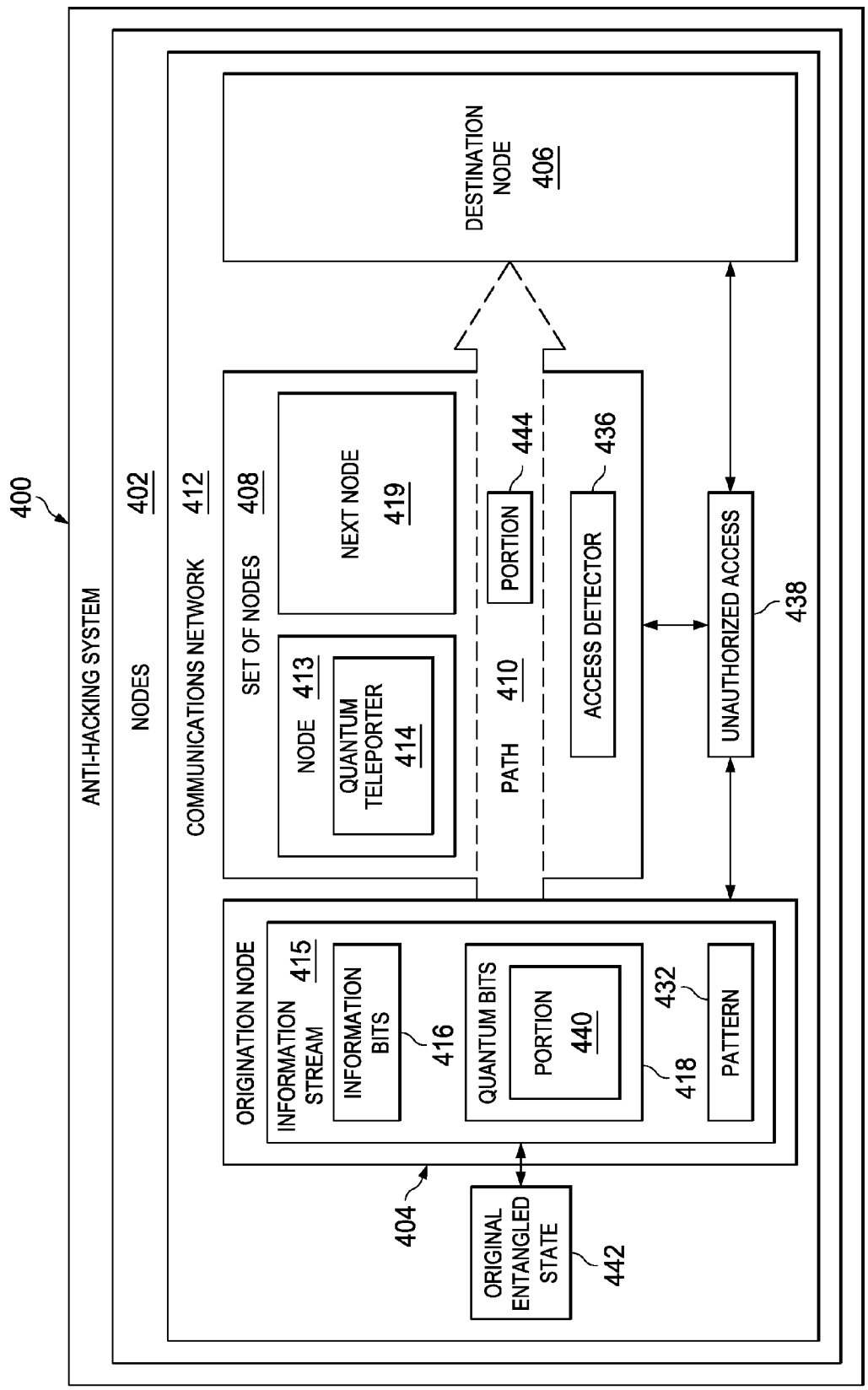
FIG. 4 an illustration of an anti-hacking system in the form of a block diagram in accordance with an illustrative embodiment.

Turning now to FIG. 4, an illustration of an anti-hacking system in the form of a block diagram is depicted in accordance with an illustrative embodiment. Anti-hacking system 400 may be implemented in communications environment 100 in FIG. 1 to reduce unauthorized access to encrypted data 114.

In this illustrative example, anti-hacking system 400 includes nodes 402. As depicted, nodes 402 include origination node 404 and destination node 406.

In this illustrative example, nodes 402 also includes set of nodes 408. As depicted, set of nodes 408 form path 410. As used herein, "a set of" when used with reference to items means zero or more items. For example, set of nodes 408 is zero or more nodes. In other words, a set may be a null set in some illustrative examples. When set of nodes 408 is a null set, a direct connection is present between origination node 404 and destination node 406.

In this illustrative example, path 410 may be formed using different types of connections. For example, path 410 includes at least one of a wireless communications channel, a wired communications channel, an optical communications channel, a fiber optic channel, or some other suitable type of channel. Further, as depicted, origination node 404, destination node 406, and set of nodes 408 may form communications network 412. In some illustrative examples, one node in nodes 402 may be connected to another node in nodes 402. In other illustrative examples, nodes 402 may act as switches in which one node in nodes 402 may be connected to multiple nodes in nodes 402. As depicted, nodes 402 comprises at least one of a communications device, a switching device, a network switch, a router, a processor unit, a computer, an integrated circuit, a modem, a hub, a server, a workstation, a digital handset, or some other type of communications device forming a network.

Additionally, node 413 in set of nodes 408 may include quantum teleporter 414 that receives information stream 415 in which incoming photons carry information bits 416 and quantum bits 418 and sends outgoing photons carrying information bits 416 and quantum bits 418 to next node 419 along path 410 to destination node 406.

As depicted, origination node 404 generates information stream 415. Information stream 415 comprises information bits 416 and quantum bits 418 that are interspersed with each other. The manner in which information bits 416 and quantum bits 418 are interspersed in this example is pattern 432.

The interspersing of information bits 416 and quantum bits 418 hides information bits 416 from third parties who do not know pattern 432. As a result, information stream 415 may appear to be noise to a party that does not know pattern 432. In this manner, information bits 416 are hidden within a steam of quantum bits 418 in information stream 415.

In the illustrative example, information bits 416 and quantum bits 418 are comprised of at least one of photons or electrons. Information bits 416 carry information. As depicted, access detector 436 in set of nodes 408 detects unauthorized access 438. Access detector 436 may be located in node 413 in this illustrative example. When set of nodes 408 is a null set, access detector 436 may be located in destination node 406.

Quantum bits 418 may be examined to determine whether unauthorized access 438 has occurred for information stream 415. In some illustrative examples, quantum bits 418 also carry information.

Origination node 404 sends information stream 415 to destination node 406 along path 410. Destination node 406 is the node in nodes 402 to which the information stream 415 is directed.

In this illustrative example, node 413 in set of nodes 408 transmits information stream 415 through node 413 along path 410 to destination node 406. As used herein, transmitting information stream 415 may include at least one of receiving information stream 415 at node 413 or sending information stream 415 from node 413.

As depicted, information stream 415 comprises information bits 416 and quantum bits 418 that are interspersed with each other. As depicted, node 413 examines portion 440 of quantum bits 418. In the illustrative example, portion 440 that is examined may be from none of quantum bits 418 to all of quantum bits 418. As depicted, node 413 indicates an occurrence of unauthorized access 438 to the information stream when original entangled state 442 in portion 440 of quantum bits 418 is absent from the examination of quantum bits 418. In particular, access detector 436 examines portion 440 of quantum bits 418 and indicates an occurrence of unauthorized access 438.

In the illustrative example, the occurrence of unauthorized access 438 may be added as information to information stream 415. In another illustrative example, occurrence of unauthorized access 438 may be indicated information sent on a completely different communication network, on a different path, or on a different connection than the existing information stream.

As an illustrative example, this occurrence of unauthorized access 438 is sent to a node or other device that will handle unauthorized access 438. For example, the indication of the occurrence is sent to origination node 404, a node in set of nodes 408, destination node 406, or some other device or destination.

In the illustrative example, original entangled state 442 has a property selected from one of position, spin, polarization, and momentum. When unauthorized access 438 occurs, original entangled state 442 collapses. In other words, a portion of the wave function for a quantum bit in quantum bits 418 changes to a final state when the quantum bit is examined. The portion of the wave function may be a property such as property selected from one of position, spin, polarization, momentum, or some other suitable property.

As depicted, portion 444 of path 410, where unauthorized access 438 occurred, is identified when original entangled state 442 of portion 440 of quantum bits 418 is absent. Also, path 410 is changed to avoid unauthorized access 438.

Also, with anti-hacking system 400, unencrypted data 110 may be sent from first communicator 106 to second communicator 108 at a lower level of encryption for encrypted data 114. As a result, the amounts of processing resources for encrypted data 114 may be reduced. The hiding of information bits 416 by mixing information bits 416 with quantum bits 418 allows for reduced levels of encryption to be used. Also, the ability to detect when unauthorized access 438 has occurred also allows for flexibility in encryption.

If unauthorized access 438 has not occurred, a lower level of encryption may be used. If unauthorized access 438 is detected, at least one of increasing the level of encryption or changing path 410 may occur. As a result, the amount of processing resources needed to transmit information stream 415 from origination node 404 to destination node 406 may be reduced.

The illustration of anti-hacking system 400 in FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, node 413 may be destination node 406. In other words, origination node 404 may communicate directly with destination node 406. In another illustrative example, quantum bits 418 may also carry information in addition to being used to determine whether an occurrence of unauthorized access 438 has occurred.

Further, one or more access detectors may be used in addition or in place of access detector 436 access detector. These other access detectors may be located in other nodes in set of nodes 408.

Further, access detector 436 may be implemented in software, hardware, firmware or a combination thereof. When software is used, the operations performed by access detector 436 may be implemented in program code configured to run on hardware, such as a processor unit. When firmware is used, the operations performed by access detector 436 may be implemented in program code and data and stored in persistent memory to run on a processor unit. When hardware is employed, the hardware may include circuits that operate to perform the operations in access detector 436.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figures 5, 6:
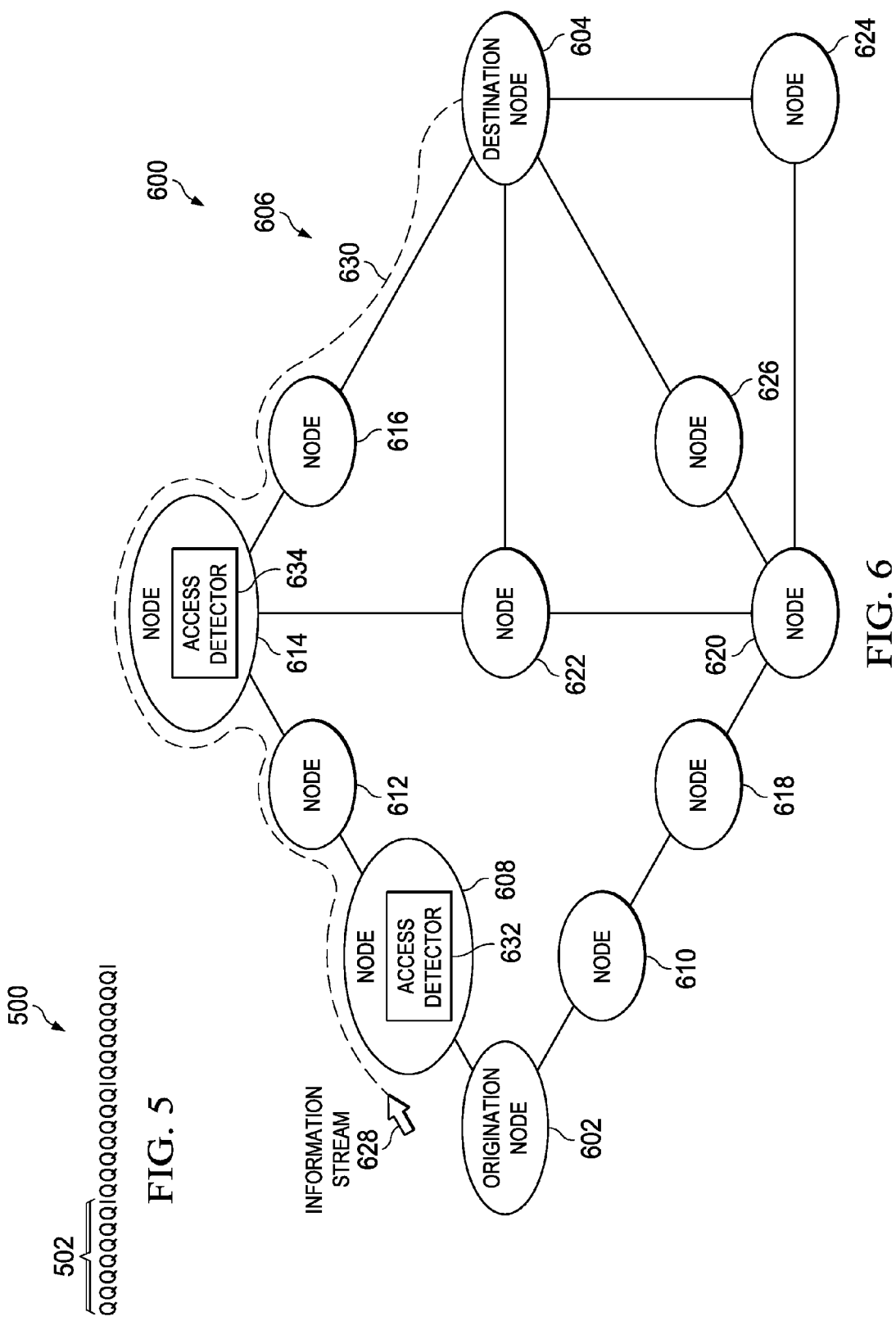
FIG. 5 is an illustration of an information stream in accordance with an illustrative embodiment.
FIG. 6 is an illustration of a communications network in accordance with an illustrative embodiment.

Turning next to FIG. 5, an illustration of an information stream is depicted in accordance with an illustrative embodiment. In this illustrative example, information stream 500 is an example of one implementation for information stream 415 in FIG. 4.

As depicted, information stream 500 includes information bits identified by "I" and quantum bits identified by "Q" in information stream 500. Information stream 500 has pattern 502. In this illustrative example, pattern 502 of information bits and quantum bits is a repeating pattern in information stream 500. As depicted, the pattern is 7 quantum bits and 1 information bit.

In other illustrative examples, information stream 500 may use other patterns. Some patterns may be less apparent. For example, pseudorandom noise (PRN) sequences may be used. Although a pseudorandom noise sequence seems to lack any definite pattern, a pseudorandom noise sequence is a deterministic sequence of pulses that repeat after a period. The length of the period may be selected such that the sequence appears to be random.

As depicted, information bits carry the information and quantum bits are indicators of whether an unauthorized access has occurred. In some illustrative examples, some or all of the quantum bits may also carry information in information stream 500.

In this example, pattern 502 of information bits and quantum bits may serve to hide the information in the information bits. The quantum bits may be viewed by an unauthorized party as noise when the unauthorized party does not know which bits carry the information. With more complex patterns used for pattern 502 in information stream 500, the likelihood that an unauthorized party will be able to extract the information from information bits in information stream 500 is reduced.

In addition, the quantum bits may have an entangled state. As a result, the quantum bits may be used to determine whether the information stream was intercepted during the transmission of information stream 500 on a path from an origination node to a destination node.

Turning next to FIG. 6, an illustration of a communications network is depicted in accordance with an illustrative embodiment. Communications network 600 is an example of a communications network in which anti-hacking system 400 in FIG. 4 can be implemented.

In this illustrative example, communications network 600 includes origination node 602 and destination node 604. Communications network 600 also includes nodes 606. Node 608, node 610, node 612, node 614, node 616, node 618, node 620, node 622, node 624, and node 626 are present in nodes 606. Nodes 606 form a network though which origination node 602 sends information stream 628 to destination node 604.

In this example, information stream 628 is transmitted by origination node 602 through a portion of nodes 606 on path 630 to destination node 604. Path 630 may be selected by information in information stream 628. For example, a first portion of information stream 628 may include an identification of nodes 606 that are used to form path 630. In other illustrative examples, path 630 may be set by nodes 606 communicating with each other to setup path 630. In another illustrative example, a path may be formed from origination node 602 to destination node 604 through nodes 610, 618, 620, and 626. In yet another illustrative example, information stream 628 may be directly sent to node 608, which may be a final destination node. An anti-hacking system may be implemented in at least one of nodes 606 or destination node 604.

In this illustrative example, path 630 includes node 608, node 612, node 614, and node 616. An anti-hacking system may be implemented in at least one of node 608, node 612, node 614, node 616 or destination node 604. Any number of these nodes may include an access detector. In this example, node 608 includes access detector 632 and node 614 includes access detector 634.

Access detector 632 and access detector 634 know which bits in information stream 628 are quantum bits. The identification of the pattern of information bits and quantum bits is sent to access detector 632 and access detector 634. In this example, the pattern is pattern 502 in FIG. 5. For example, pattern 502 may be sent to access detector 632 and access detector 634 from origination node 602 prior to origination node 602 transmitting information stream 628. Alternatively, destination node 604, or some other source, may select pattern 502 for use by origination node 602 in generating information stream 628.

As illustrated, access detector 632 and access detector 634 examine one or more of the quantum bits in information stream 628 to determine whether an unauthorized access has occurred. Access detector 632 and access detector 634 may each be assigned particular quantum bits in pattern 502 in information stream 628 to examine. In this example, access detector 632 examines the first and third quantum bits in pattern 502 and access detector 634 examines the second and fourth quantum bits in pattern 502 for information stream 628.

If an unauthorized access is detected by at least one of access detector 632 or access detector 634, the portion of path 630 in which the unauthorized access occurred may be identified. For example, if access detector 632 in node 608 does not detect an unauthorized access in the quantum bits that access detector 632 examines, and access detector 634 in node 614 detects an unauthorized access in the quantum bits that access detector 634 examines, the portion of path 630 in which the unauthorized access occurred is likely to be in a portion of path 630 that includes node 612 and node 614.

With the identification of the portion of path 630 in which the unauthorized access has occurred, path 630 may be changed to avoid the unauthorized access. For example, path 630 may be changed to include node 610, node 618, node 620, and node 622 to reach destination node 604.

In this example, access detectors may be located on all or some of the nodes depending upon the particular communications network used. Also, the number and location of the access detectors may depend on the level of security desired. For example, if a maximum security is desired, access detectors may be placed at every single node. Other factors may include cost, other security features, use of processing power, and other suitable factors.

The illustration of communications network 600 in FIG. 6 is not meant to limit the manner in which other communications networks may be implemented. For example, other nodes in addition or in place of the 10 nodes forming nodes 606 may be used. The nodes also may include a quantum teleporter.

Figure 7:
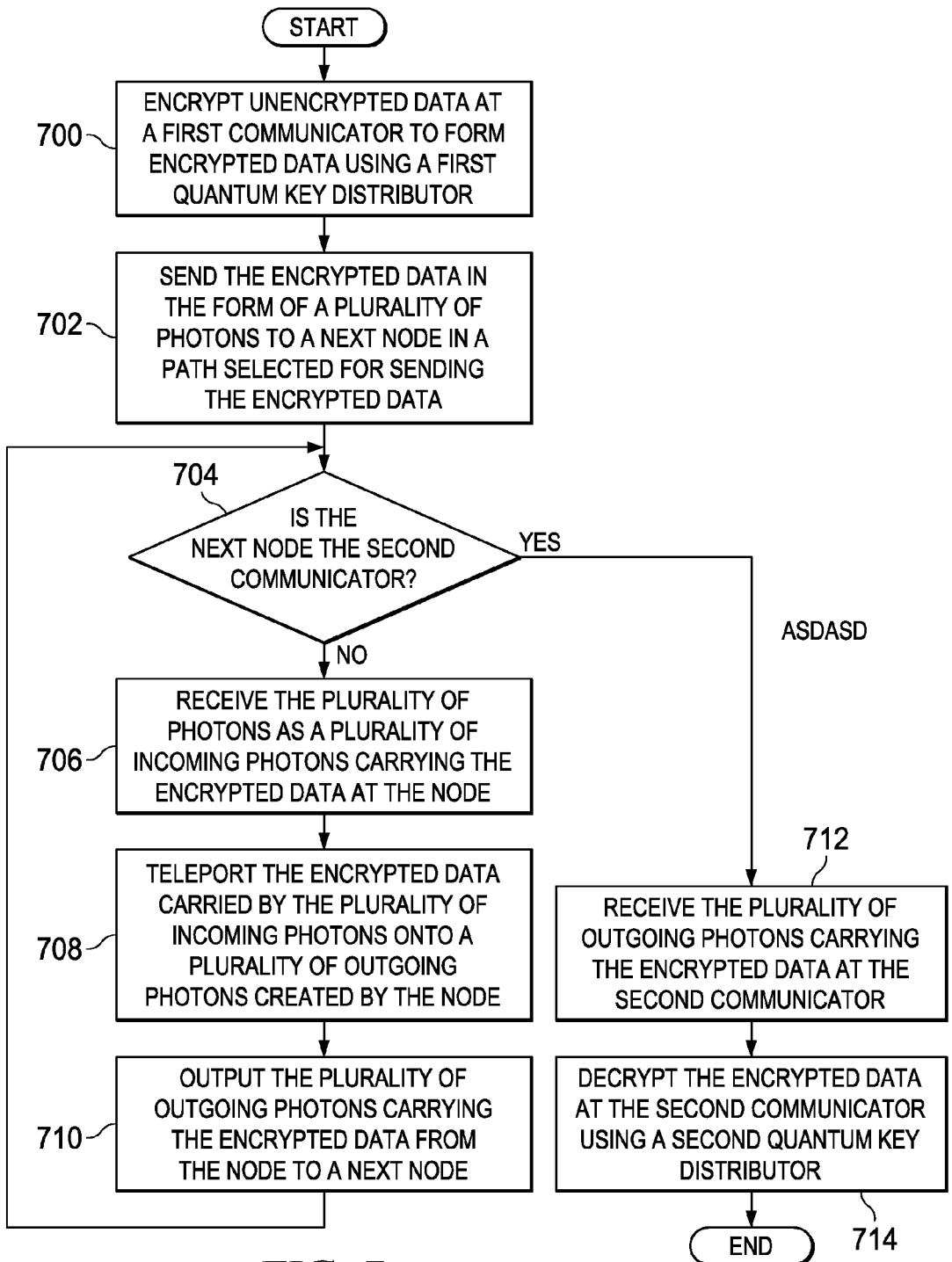
FIG. 7 is an illustration of a process for sending encrypted data from a first communicator to a second communicator in a communications network in the form of a flowchart in accordance with an illustrative embodiment.

With reference now to FIG. 7, an illustration of a process for sending encrypted data from a first communicator to a second communicator in a communications network in the form of a flow chart is depicted in accordance with an illustrative embodiment. The process illustrated in FIG. 7 may be used to send, for example, encrypted data 114 from first communicator 106 to second communicator 108 in FIG. 1.

The process begins by the first communicator encrypting unencrypted data to form encrypted data using a first quantum key distributor (operation 700). Next, the encrypted data is sent to a next node in a path selected for sending the encrypted data in the form of a plurality of photons (operation 702). A determination is made as to whether the next node is the second communicator (operation 704).

If the next node is not the second communicator, the node receives the plurality of photons as a plurality of incoming photons carrying the encrypted data (operation 706). Thereafter, the node teleports the encrypted data carried by the plurality of incoming photons onto a plurality of outgoing photons created by the node (operation 708). The node outputs the plurality of outgoing photons carrying the encrypted data to a next node (operation 710), with the process returning to operation 704 as described above.

With reference again to operation 704, if the next node is the second communicator, the second communicator receives the plurality of outgoing photons carrying the encrypted data (operation 712). The second communicator then decrypts the encrypted data using a second quantum key distributor (operation 714), with the process terminating thereafter.

Figure 8:
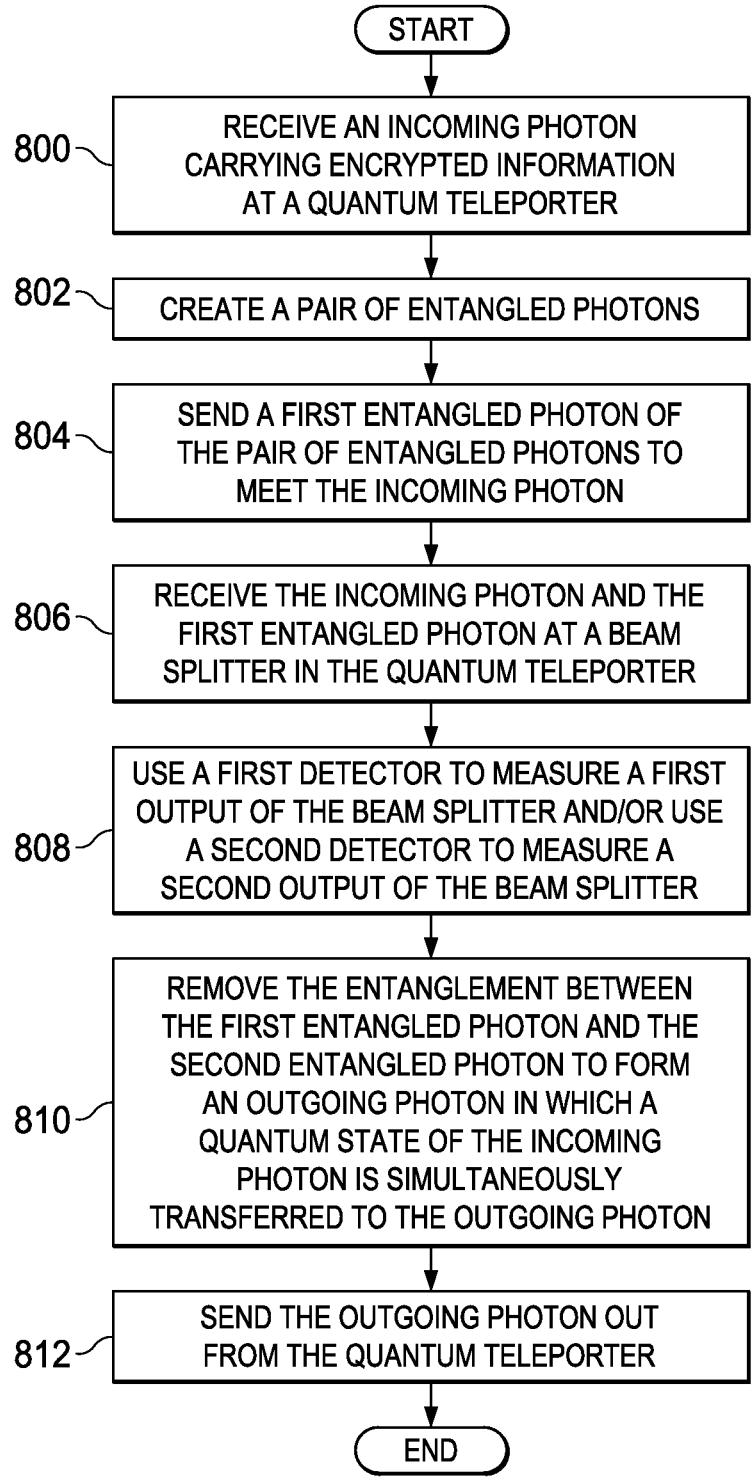
FIG. 8 is an illustration of a process for sending encrypted data across a node in the form of a flowchart in accordance with an illustrative embodiment.

With reference now to FIG. 8, an illustration of a process for sending encrypted data across a node is depicted in the form of a flowchart in accordance with an illustrative embodiment. The process illustrated in FIG. 8 may be used to send, for example, without limitation, encrypted data 114 across node 124 in FIG. 1. Further, the process illustrated in FIG. 8 may be implemented using quantum teleporter 130 in FIG. 1.

The process begins by the quantum teleporter receiving an incoming photon carrying encrypted information (operation 800). A pair of entangled photons is created (operation 802). A first entangled photon of the pair of entangled photons is sent to meet the incoming photon (operation 804). The incoming photon and the first entangled photon are received at a beam splitter in the quantum teleporter (operation 806). A first detector may be used to measure a first output of the beam splitter and/or a second detector may be used to measure a second output of the beam splitter (operation 808).

In response to the incoming photon and the first entangled photon meeting at the beam splitter and the first output and/or the second output of the beam splitter being measured, the entanglement between the first entangled photon and the second entangled photon is removed to form an outgoing photon in which a quantum state of the incoming photon is simultaneously transferred to the outgoing photon (operation 810). In operation 810, transferring the quantum state of the incoming photon to the outgoing photon teleports the encrypted information carried by the incoming photon to the outgoing photon. The outgoing photon is sent out from the quantum teleporter (operation 812), with the process terminating thereafter.

In this manner, the illustrative embodiments described above provide a method for sending quantum encrypted data across nodes without requiring that the nodes have quantum key distribution capabilities. In particular, the quantum encrypted data may remain encrypted while being sent from the first communicator to the second communicator.

Figure 9:
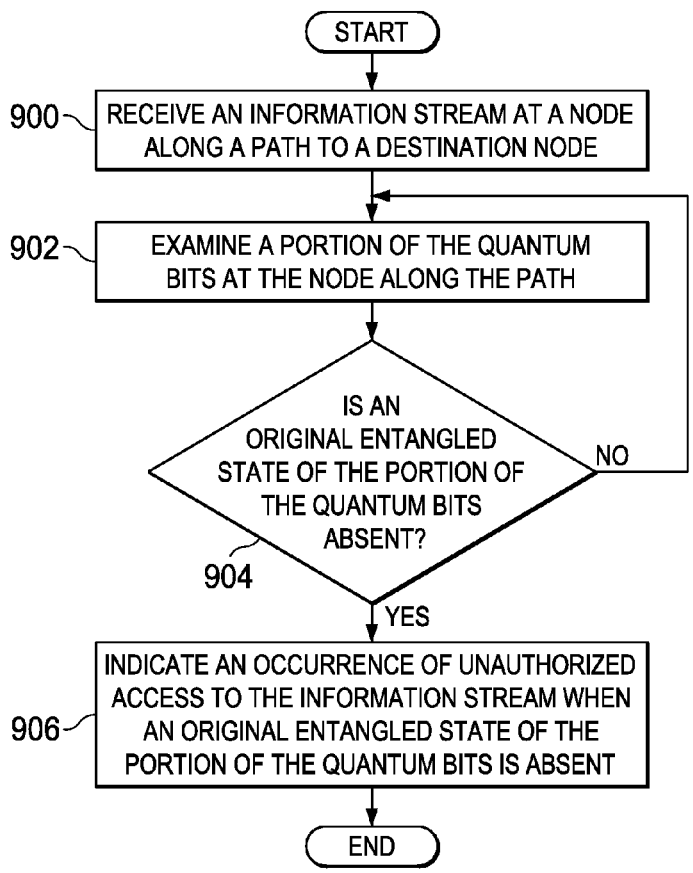
FIG. 9 is an illustration of a process for reducing unauthorized access of an information stream in the form of a flowchart in accordance with an illustrative embodiment.

With reference next to FIG. 9, an illustration of a process for reducing unauthorized access of an information stream in the form of a flowchart is depicted in accordance with an illustrative embodiment. The process illustrated in FIG. 9 may be implemented using anti-hacking system 400 in FIG. 4.

The process in FIG. 9 may be implemented in one more nodes in a path through which an information stream flows. An origination node generates the information stream comprising the information bits and quantum bits that are interspersed with each other and then sends the information stream to the destination node along the path. This information stream is transmitted through nodes on the path in the illustrative examples.

The process begins receiving an information stream at a node along a path to a destination node (operation 900). The information stream comprises information bits and quantum bits that are interspersed with each other. The process examines a portion of the quantum bits at the node along the path (operation 902). A determination is made as to whether an original entangled state of the portion of the quantum bits is absent (operation 904).

If the original entangled state of the portion of the quantum bits is absent, the process indicates an occurrence of unauthorized access to the information stream when an original entangled state of the portion of the quantum bits is absent (operation 906), with the process terminating thereafter. Otherwise the process returns to operation 902.

When an occurrence of unauthorized access is present, different actions may be taken. For example, a new path may be selected for transmitting the information stream. As another example, a level of encryption for the information stream may be changed. The level of encryption may change from no encryption to encrypting the information. As another example, the key length of the encryption may be increased. In one example, the key length may increase from 128 bits to 256 bits. In another example, a different type of encryption process may be used. In yet another example, the pattern of information bits and quantum bits may be changed.

In yet another illustrative example, the action may be to continue to send the information stream. The information in the information stream, however, may include information that is inaccurate, a program for a virus, or other information other than the information that was intended for receipt by the origination node. The actual information may be sent over another path or through a different communications system.

Figure 10:
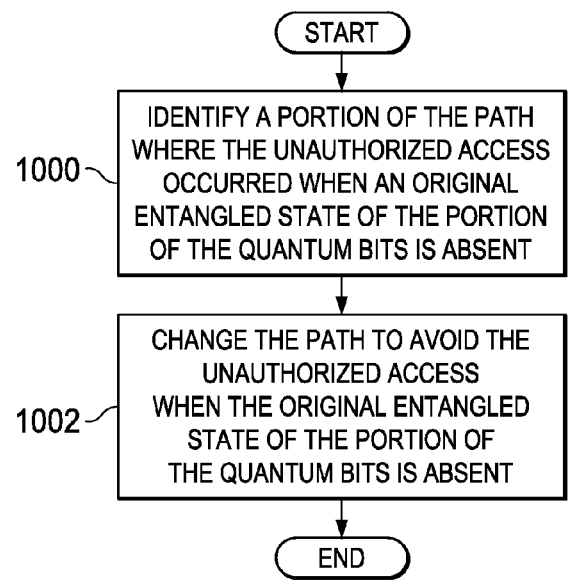
FIG. 10 is an illustration of a process for managing flow of an information stream when an unauthorized access of the information stream has occurred in the form of a flowchart in accordance with an illustrative embodiment.

Turning next to FIG. 10, an illustration of a process for managing flow of an information stream when an unauthorized access of the information stream has occurred in the form of a flowchart is depicted in accordance with an illustrative embodiment. The process illustrated in FIG. 10 may be implemented using anti-hacking system 400 in FIG. 4.

The process begins by identifying a portion of the path where the unauthorized access occurred when an original entangled state of the portion of the quantum bits is absent (operation 1000). The process then changes the path to avoid the unauthorized access when the original entangled state of the portion of the quantum bits is absent (operation 1002), with the process terminating thereafter.

In operation 1002, changing the path to avoid the unauthorized access when the original entangled state of the portion of the quantum bits is absent may include identifying a portion of the path where the unauthorized access occurred when the original entangled state of the portion of the quantum bits is absent. Operation 1002 also may include changing the path to avoid the unauthorized access to exclude the portion of the path where the unauthorized access occurred.

The portion of the path may be some or all of the path depending on the set of nodes present in the path. If path is a direct connection between the origination node and the destination node, a different connection between these two nodes may be used. If another connection is unavailable, the transmission of the information stream may be halted.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
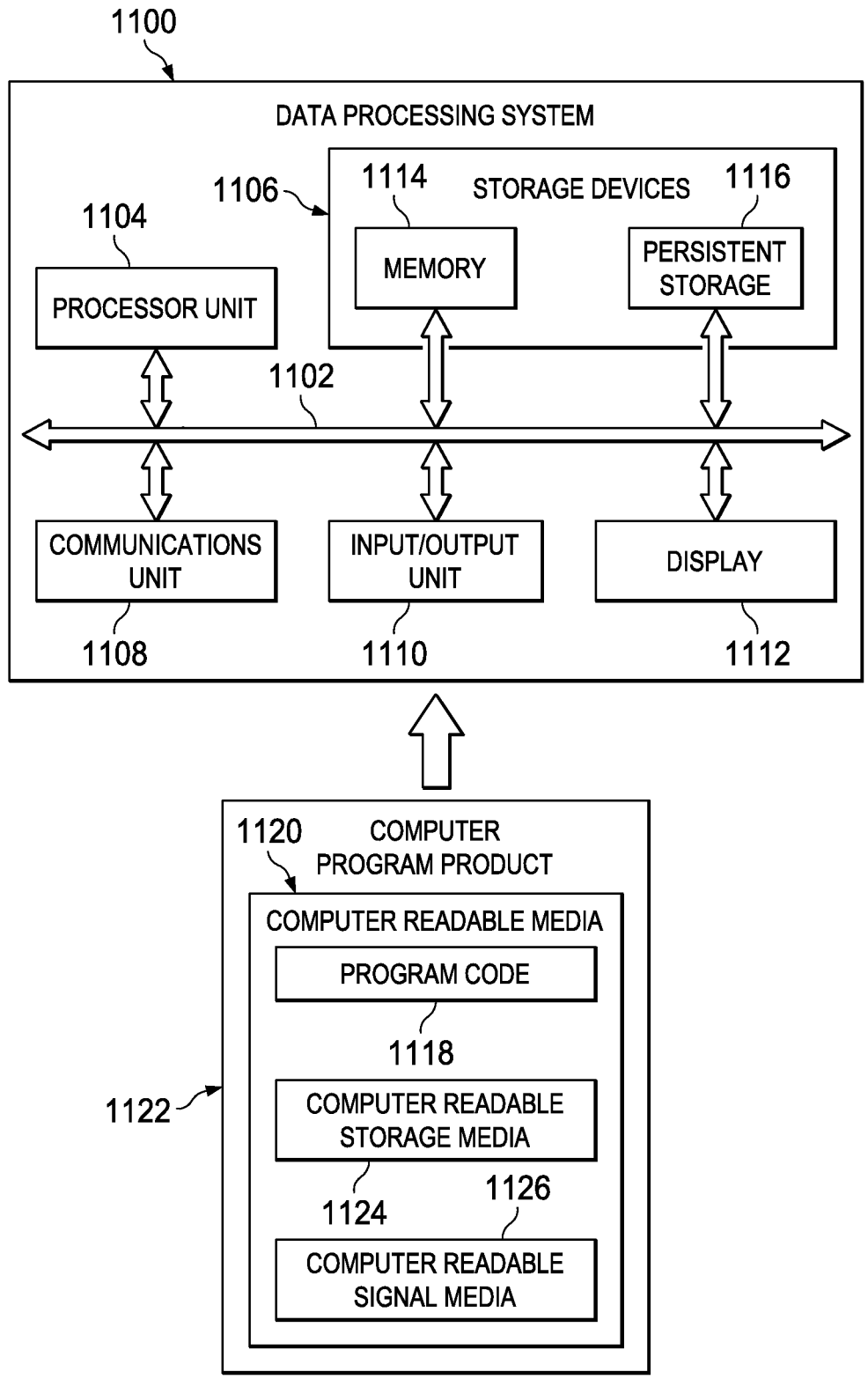
FIG. 11 is an illustration of a data processing system in the form of a block diagram in accordance with an illustrative embodiment.

Turning now to FIG. 11, an illustration of a data processing system in the form of a block diagram is depicted in accordance with an illustrative embodiment. Data processing system 1100 may be used to implement one or more nodes in FIGS. 1, 2, 4, and 6. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multi-processor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems, devices, or some combination thereof. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, or some other type of signal that can be transmitted over physical communications links, wireless communications links, or some combination thereof.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

Thus, one or more illustrative embodiments provide a method and apparatus for reducing unauthorized access to an information stream. As described above, an information stream is transmitted through a node in a set of nodes along a path to a destination node. The information stream comprises information bits and quantum bits that are interspersed with each other. A portion of the quantum bits may be examined at the node along the path. An occurrence of unauthorized access to the information stream is indicated when an original entangled state of the portion of the quantum bits is absent. With this indication, actions may be taken in response to the unauthorized access.

In this manner, more secure communication of information may occur and protect the transmission of information streams from interception or modification. Further, the level of encryption may be reduced using the anti-hacking system in the illustrative examples. As a result, the processing resources needed for transmitting information may be reduced through the less intensive processing that occurs with a lower level of encryption.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing unauthorized access to information comprising information bits, the method comprising:
   securing the information within an information stream by interspersing the information bits and quantum bits into the information stream using a predetermined pattern,
   wherein the information is transmitted in the stream completely by the information and not by the quantum bits, the quantum bits comprising entangled electrons or entangled photons,
   and the information bits comprising non-entangled electrons or non-entangled photons;
   receiving the information stream at a node along a path to a destination node,
   examining a portion of the quantum bits at the node along the path;
   and indicating an occurrence of unauthorized access to the information stream when an original entangled state of the portion of the quantum bits is absent.

2. The method of claim 1 further comprising:
   sending the information stream to the destination node along the path; and
   reading the information only from the information bits.

3. The method of claim 1 further comprising:
   identifying a portion of the path where the unauthorized access occurred when the original entangled state of the portion of the quantum bits is absent.

4. The method of claim 1 further comprising:
   changing the path to avoid the unauthorized access when the original entangled state of the portion of the quantum bits is absent.

5. The method of claim 4, wherein changing the path to avoid the unauthorized access when the original entangled state of the portion of the quantum bits is absent comprises:
   identifying a portion of the path where the unauthorized access occurred when the original entangled state of the portion of the quantum bits is absent; and
   changing the path to avoid the unauthorized access to exclude the portion of the path where the unauthorized access occurred.

6. The method of claim 1, wherein the node is selected from one of a communications device, a switching device, a network switch, a router, a processor unit, a computer, an integrated circuit, a modem, a hub, a server, a workstation, a digital handset, or some other type of communications device forming a network.

7. The method of claim 1, wherein the node includes a quantum teleporter that receives the information stream and sends the information stream to a next node along the path to the destination node.

8. The method of claim 1, wherein the original entangled state has a property selected from one of position, spin, polarization, and momentum.

9. The method of claim 1, wherein the node is the destination node.

10. The method of claim 1, wherein the path includes at least one of a wireless communications channel, a wired communications channel, an optical communications channel, or a fiber optic channel.

11. An apparatus comprising:
    an origination node configured to:
       generate information bits and quantum bits, the quantum bits comprising entangled electrons or entangled photons having a corresponding original entangled states, and the information bits comprising non-entangled electrons or non-entangled photons,
       wherein the information bits are comprised by information and the quantum bits are not comprised by the information:
    secure the information by interspersing the information bits and the quantum bits into an information stream using a predetermined pattern; and send the information stream to a destination node along a path.

12. The apparatus of claim 11 further comprising:
    a node configured to:
       receive the information stream along the path to the destination node;
       examine a portion of the quantum bits at the node along the path; and
       indicate an occurrence of an unauthorized access to the information stream when any of the corresponding original entangled states of the portion of the quantum bits are absent.

13. The apparatus of claim 12, wherein a portion of the path where the unauthorized access occurred is identified when any of the corresponding original entangled states of the portion of the quantum bits are absent.

14. The apparatus of claim 12, wherein the path is changed to avoid the unauthorized access.

15. The apparatus of claim 12, wherein the node is selected from one of a communications device, a switching device, a network switch, a router, a processor unit, a computer, an integrated circuit, a modem, a hub, a server, a workstation, a digital handset, or some other type of communications device forming a network.

16. The apparatus of claim 12, wherein the node includes a quantum teleporter that receives the information stream sends the information stream to the destination node.

17. The apparatus of claim 12, wherein the node is the destination node.

18. A communications system comprising:
    an origination node configured to:
       generate information bits and quantum bits,
          the quantum bits comprising entangled electrons or entangled photons having a corresponding original entangled state, and the information bits comprising non-entangled electrons or non-entangled photons,
          wherein the information bits are comprised by information and the quantum bits are not comprised by the information;
       secure the information by interspersing the information bits and the quantum bits into an information stream using a predetermined pattern;
       and send the information stream from the origination node;
    a destination node that receives the information stream;
    and a set of nodes that form a path from the origination node to the destination node, wherein a node in the set of nodes is configured to receive the information stream along the path to the destination node;
       examine a portion of the quantum bits;
       and indicate an occurrence of unauthorized access to the information stream when an original entangled state of the portion of the quantum bits is absent.

19. The communications system of claim 18, wherein the destination node reads the information only from the information bits.

20. The communications system of claim 18, wherein the origination node is further configured to change the path to avoid the unauthorized access when the original entangled state of the portion of the quantum bits is absent.

* * * * *